June 14, 1949.　　　R. L. HASCHE　　　2,473,427
REGENERATIVE FURNACE CONSTRUCTION
Filed May 5, 1945　　　　　　　　　　　2 Sheets-Sheet 1
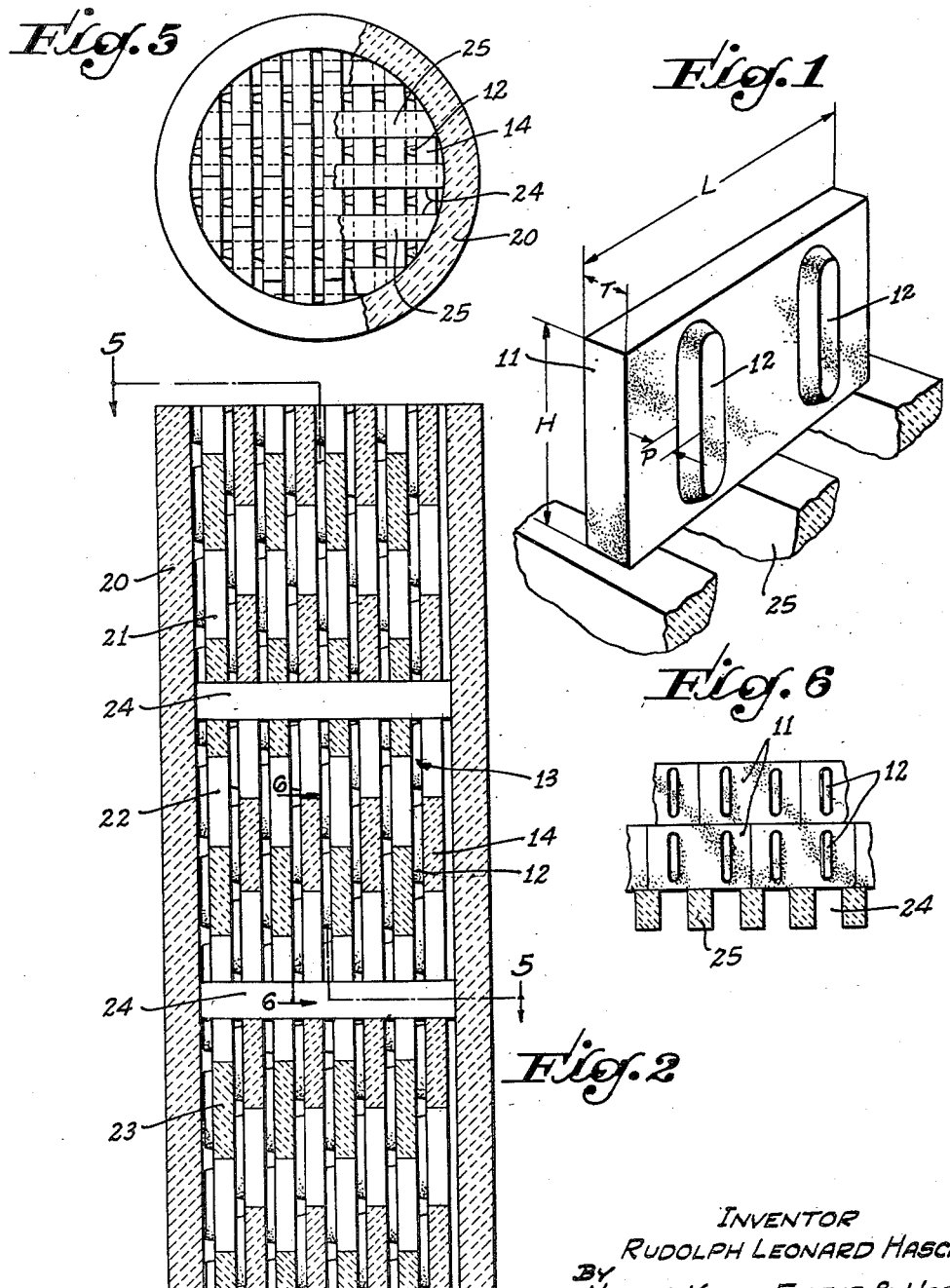
INVENTOR
RUDOLPH LEONARD HASCHE
BY
HARRIS, KIECH, FOSTER & HARRIS
FOR THE FIRM
ATTORNEYS June 14, 1949.  R. L. HASCHE  2,473,427
REGENERATIVE FURNACE CONSTRUCTION
Filed May 5, 1945  2 Sheets-Sheet 2
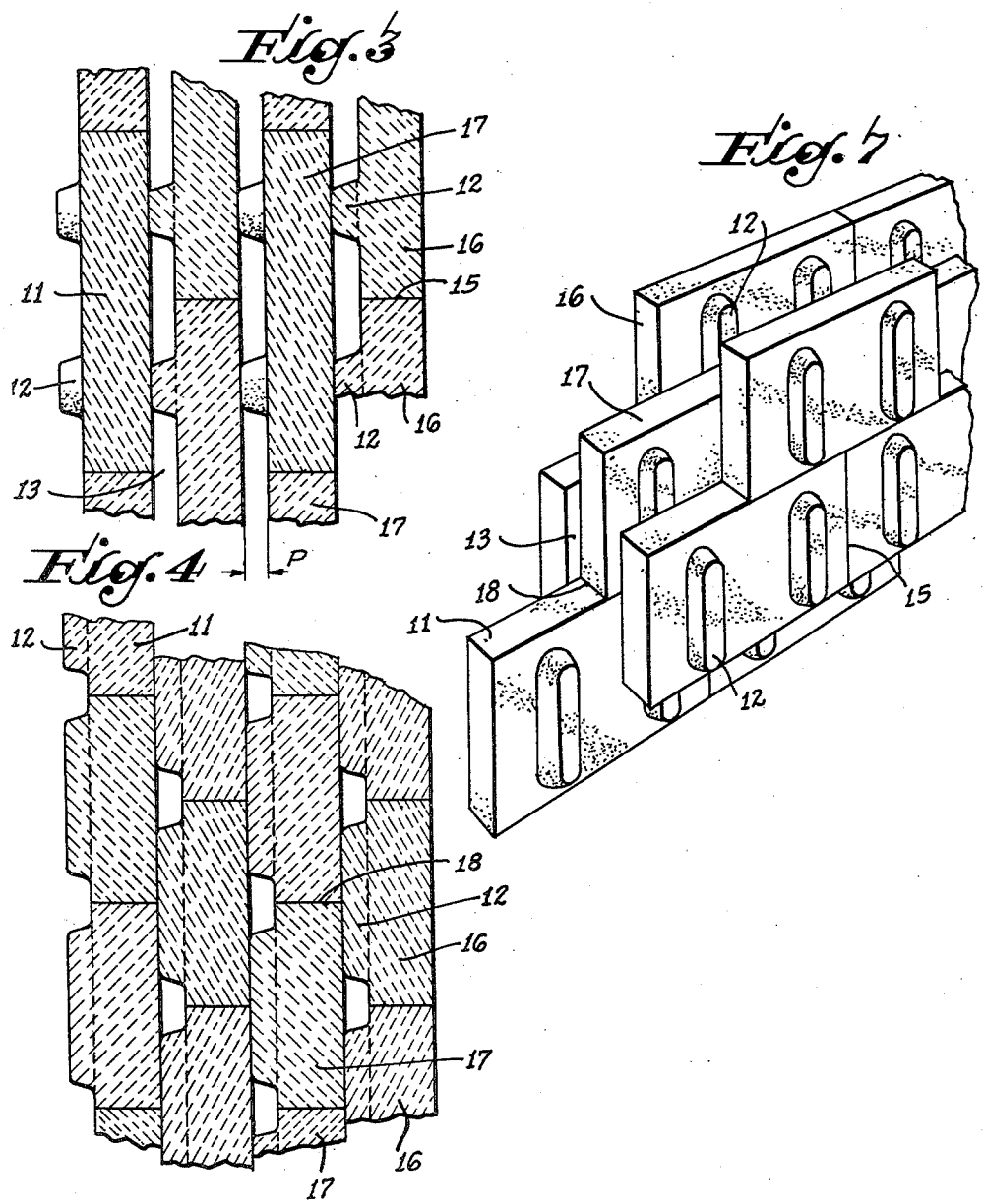
INVENTOR
RUDOLPH LEONARD HASCHE
BY
HARRIS, KIECH, FOSTER & HARRIS
FOR THE FIRM
ATTORNEYS Patented June 14, 1949

2,473,427

UNITED STATES PATENT OFFICE 2,473,427

REGENERATIVE FURNACE CONSTRUCTION

Rudolph Leonard Hasche, Johnson City, Tenn., assignor to Tennessee Eastman Corporation, Kingsport, Tenn., a corporation of Virginia Application May 5, 1945, Serial No. 592,102

3 Claims. (Cl. 263—51)

My invention relates to regenerative furnaces used to heat gases which are preferably passed upwardly through passages formed in a regenerative mass, this mass being periodically reheated, preferably by products of combustion passed downwardly threthrough, and, more specifically, it relates to the regenerative mass so used.

One great advantage of such a furnace is that the gases may be heated to a very high temperature, for example, to 2800° F. or higher, if heat refractory material can be found from which the regenerative mass may be constructed. When used to produce certain reactions, such as the conversion of methane to acetylene, temperatures as high as or, if possible, higher than said 2800° F. are desirable, the highest possible temperature at which it is possible to operate being determined by the highest temperature to which the refractory material may be heated without too rapid deterioration of the refractory. I have found that properly formed carborundum bricks will withstand temperatures around 3000° F. for a period of months if the bricks are so placed in the mass that they can individually expand and contract without restraint and without gradually shifting their position.

A further requirement for a refractory to operate satisfactorily under the conditions set forth is that it have a high heat conductivity, which carborundum possesses. For example, high alumina will withstand required temperatures, but is totally unsuited for rapid rate of heat transfer because the conductivity is only approxiamtely one-tenth that of carborundum, and consequently at rapid rates of heat transfer it is subject to severe spalling action.

It is an object of my invention to provide bricks, preferably of carborundum or some other highly heat refractory material, which can be so laid or assembled as to form a regenerative mass having free passages therethrough which may be ⅜" wide and which, when so assembled loosely without cement or other binder, can freely expand and contract under the influence of heat without materially changing the width or continuity of said passages.

Another object of my invention is to provide a structure composed of high refractory tiles, presenting to the gas flow straight, uninterrupted passageways which allow the use of high gas velocities and consequently high rates of heat transfer to and from the walls of the passageways without excessive pressure drop. The type of checkerwork used in the prior art consisting of crossed, alternate rows of bricks does not allow high gas velocities because of excessive pressure drop.

Further objects of and certain advantages inherent to my invention will be evident from the following disclosure.

In the drawings, which are for illustrative purposes only,

Fig. 1 is an isometric view of a brick used in the practice of my invention;

Fig. 2 is a sectional elevation through a regenerative mass;

Fig. 3 is a horizontal section through a portion of said mass;

Fig. 4 is a vertical section through a portion of said mass;

Fig. 5 is a plan view of the mass shown in Fig. 4, a portion thereof being shown in section on a horizontal plane indicated by the line 5—5 of Fig. 2;

Fig. 6 is a partial section of the mass shown in Fig. 2 on a vertical plane indicated by the line 6—6 of Fig. 2; and Fig. 7 is an isometric view of a portion of the mass shown in Fig. 2.

The brick 11 which I prefer to use is shown in Fig. 1. It has a length L which, for example, may be six inches, and a thickness T which may be one and one-quarter inches. The height H need not necessarily but can conveniently be one-half L, or three inches. The brick 11 can be conveniently made by making a brick two and one-half inches thick with lugs 12, hereinafter described, on both sides, and splitting it on a horizontal plane, producing two bricks, each one and one-quarter inches thick and each having lugs 12 on only one side.

The lugs preferably extend on the side of the bricks a distance somewhat shorter than the height H and extend out from the side of the brick for a distance P, which may be about three-eighths of an inch, if vertical passages 13 of this width are desired in the regenerative mass 14, as shown in Fig. 2. The bricks are preferably laid in horizontal courses, as shown in Figs. 3 and 7, the joint 15 in one course of bricks 16 being between the lugs 12 of an adjacent course 17. The courses are also staggered vertically, the joint 18 of the courses 17 being covered by the lugs 12 of the courses 16. The system of vertical and horizontal placing of the bricks insures that the passages 13 will remain open and continuous at all times. The bricks are laid loosely with sufficient clearance between the outer ends of the lugs 12 and the surface of an adjacent brick to allow the brick when heated to expand without substantial restraint. No great pains need be taken to establish a definite clearance between the lugs and an adjacent brick, as the amount of expansion is slight. Alternate vertical courses, of course, are started with bricks having a height one-half times the height H, and the top of the mass is made substantially level by filling in low courses with such half bricks. I have found that by so placing each brick that its position with relation to the passages 13 is determined solely by the lugs 12, each brick can freely expand and contract as it is alternately heated and cooled, and the bricks are free from substantial restraint and may be heated to high temperatures without spalling or other injury. In practice, I prefer to make such regenerative masses cylindrical, as shown in Fig. 5, and surround the mass 14 with a cylindrical shell of heat refractory material 20, as shown in Figs. 2 and 5. The ends of the end bricks of each course must, of course, be shaped to form such a mass.

I have constructed and operated such regenerative masses fifteen feet or more in vertical height with three-eighth inch passages therethrough, and have found that it is quite possible to heat and cool such masses with a fair uniformity of temperature at any horizontal plane, but such uniformity is improved by cross-equalizing openings in the mass. I accomplish this equalization by splitting a fifteen foot high mass up into three masses 21, 22, and 23, each about five feet high, as shown in Fig. 2. Between the masses 21 and 22 and between the masses 22 and 23 I provide cross-equalizing channels 24, as shown in Figs. 2 and 6, by laying single wide-spaced courses of bricks 25 across the mass at right angles to the bricks in the masses, that is, in planes parallel to the plane of the paper, as shown in Fig. 5. The cross channels tend to equalize and redistribute pressure in horizontal planes passing through the channels 24 and to therefore equalize both the upward flow of gas to be treated and the downward flow of gases of combustion through the passages 13.

By constructing a regenerative mass as above described, I am able to both uniformly heat the gas passing upwardly through the passages 13 and heat the mass uniformly on any horizontal plane by the products of combustion passing downwardly through the passages 13. By making the passages of uniform width due to the lugs 12, I further promote this uniformity of heat transfer both to and from the bricks 11, and force the gases and products of combustion through these passages at velocities as high as 10,000 feet a minute with a relatively low pressure head.

By the use of my invention above described, I am able to convert methane into acetylene with a yield of about fifty per cent, by weight, of acetylene for the methane used. I am also able to heat the gases to temperatures as high as 2800° F. without heating any part of the regenerative mass above 3000° F., a temperature at which the bricks 11 will last for months.

It is not necessary that the bricks be proportioned as shown in the drawings, in which the height H is one-half the length L. The height is not at all important, and it may be less or more than that shown, and, in fact, the height H may be equal to or more than the length L. In fact, in some furnaces I prefer to use a brick having a length L of eight inches and a height H of eighteen inches, the word "length" as used herein being used merely to denote a direction at right angles to the direction of gas flow.

I claim as my invention:

1. A regenerative mass for a heat regenerative furnace comprising a plurality of staggered courses of heat-resisting bricks, said bricks having two parallel integral spacers on one side thereof of substantially less dimensions than the main body of the bricks, and assembled in horizontal and vertical courses, the vertical portion of the joints between bricks in the horizontal courses being between the spacers of an adjacent horizontal course and the spacers of the bricks in the adjacent vertical courses being positioned across the joints in the horizontal plane of the bricks in the horizontal courses.

2. A regenerative mass for a regenerative furnace using bricks free from perforations and having plane surfaces with no projections therefrom except two projections on one side thereof, one of said projections being about one-quarter the length of the brick from one end of the brick, and the other projection being about one-quarter the length of the brick from the other end of the brick, said mass consisting of parallel walls each composed of said bricks laid one on top of the other in horizontal courses, these courses being staggered with relation to each other so that the projections near the right-hand end of the bricks in a specified course are in line with the projections near the left-hand end of the bricks in the courses above and below the specified course, thus providing free vertical channels between the projections, the bricks in adjacent walls being so staggered that the dividing line between courses in one wall is bridged by the projections on an adjacent wall.

3. A regenerative mass as claimed in claim 2, having cross horizontal courses of bricks without projections providing horizontal equalizing channels connecting said vertical channels.

RUDOLPH LEONARD HASCHE.

REFERENCES CITED

The following references are of record in the file of this patent:

UNITED STATES PATENTS

| Number | Name | Date |
| --- | --- | --- |
| 1,565,971 | Steudel | Dec. 15, 1925 |
| 1,686,826 | Loftus | Oct. 9, 1928 |
| 1,961,258 | Totzek | June 5, 1934 |
| 2,017,763 | Mamula | Oct. 15, 1935 |

FOREIGN PATENTS

| Number | Country | Date |
| --- | --- | --- |
| 345,247 | France | Oct. 6, 1904 |
| 372,632 | Great Britain | May 12, 1932 |
| 395,859 | Great Britain | July 27, 1933 |